April 1, 1969    D. W. SHIELDS    3,435,861
SYSTEM FOR DEBARKING LOGS

Filed Aug. 1, 1966    Sheet 1 of 4

INVENTOR.
Dean W. Shields
BY
Jennings, Carter & Thompson
Attorneys

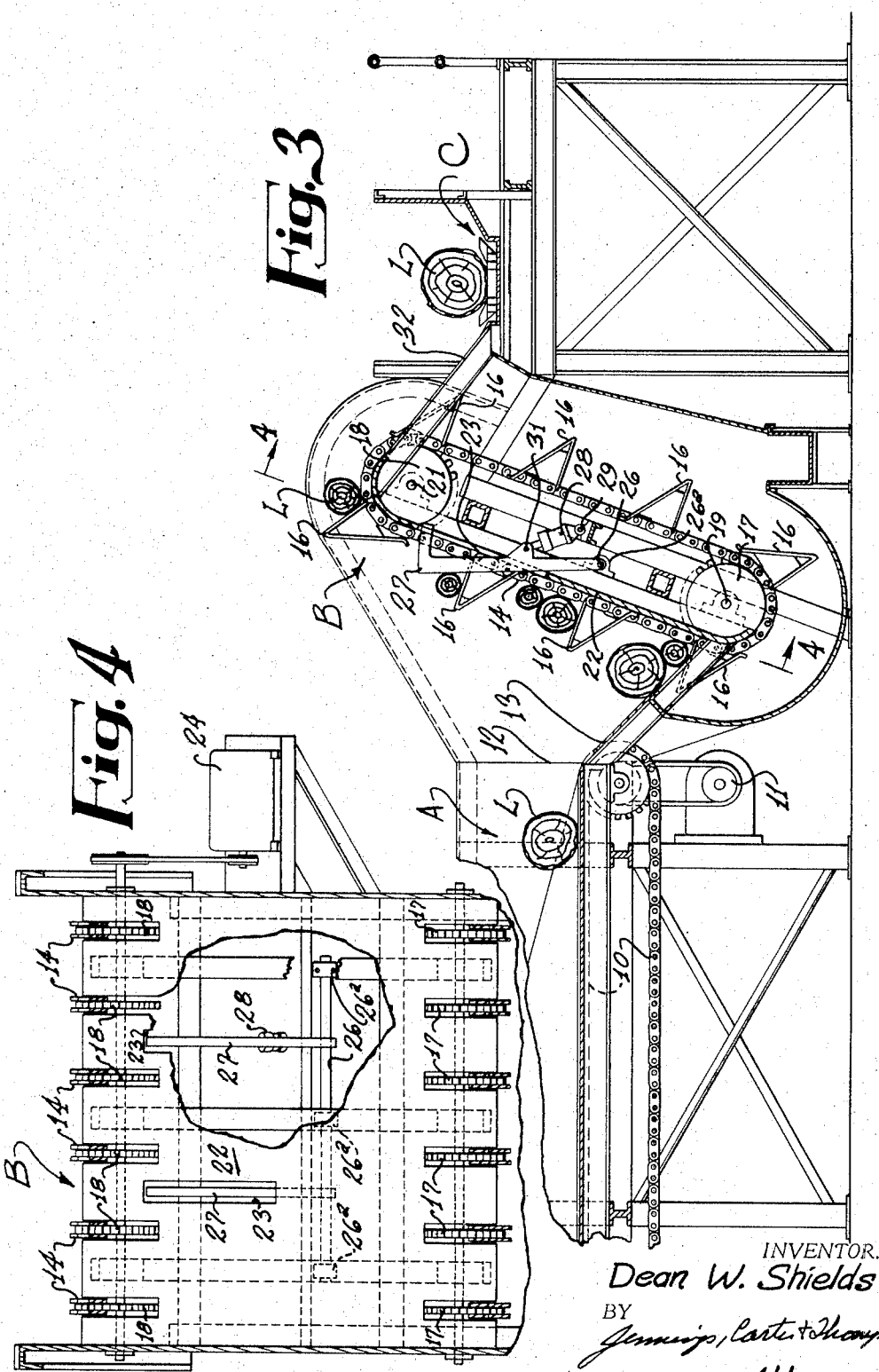

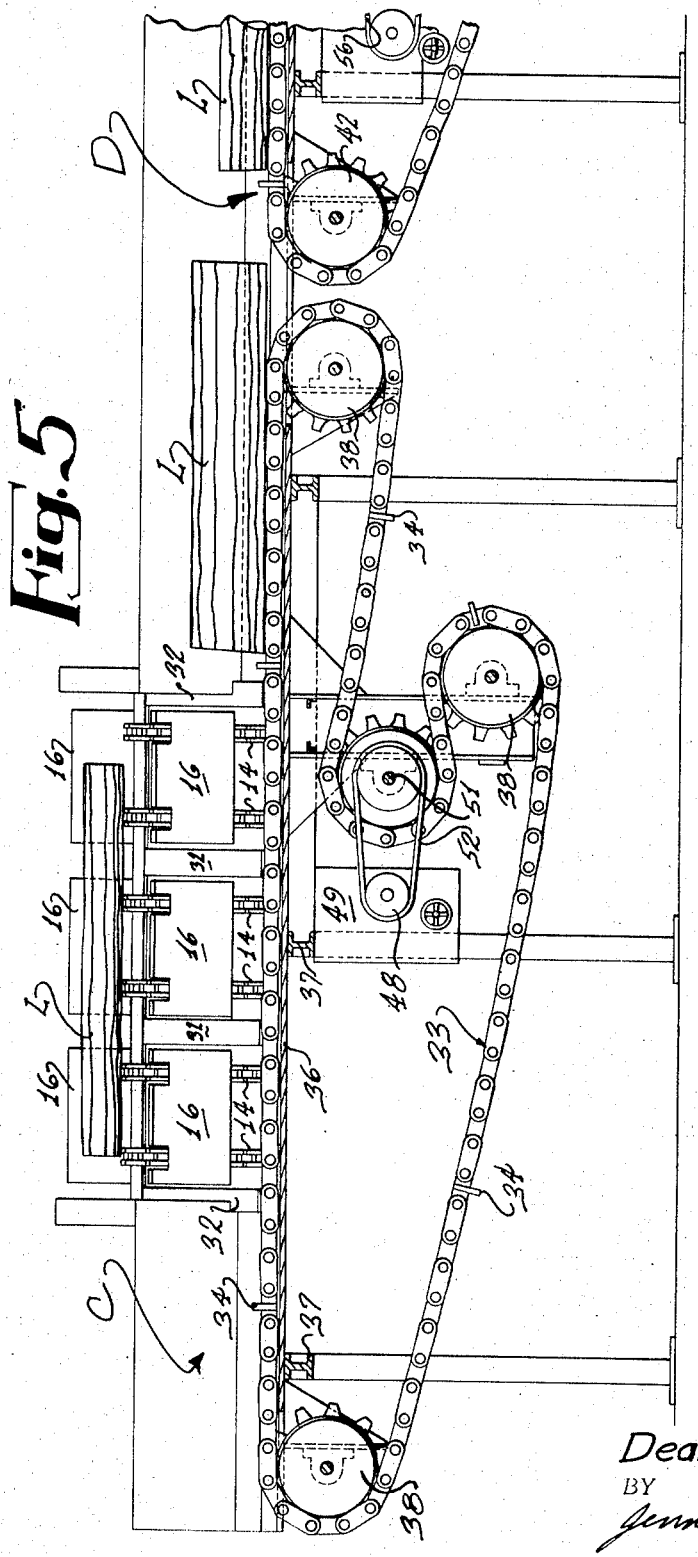

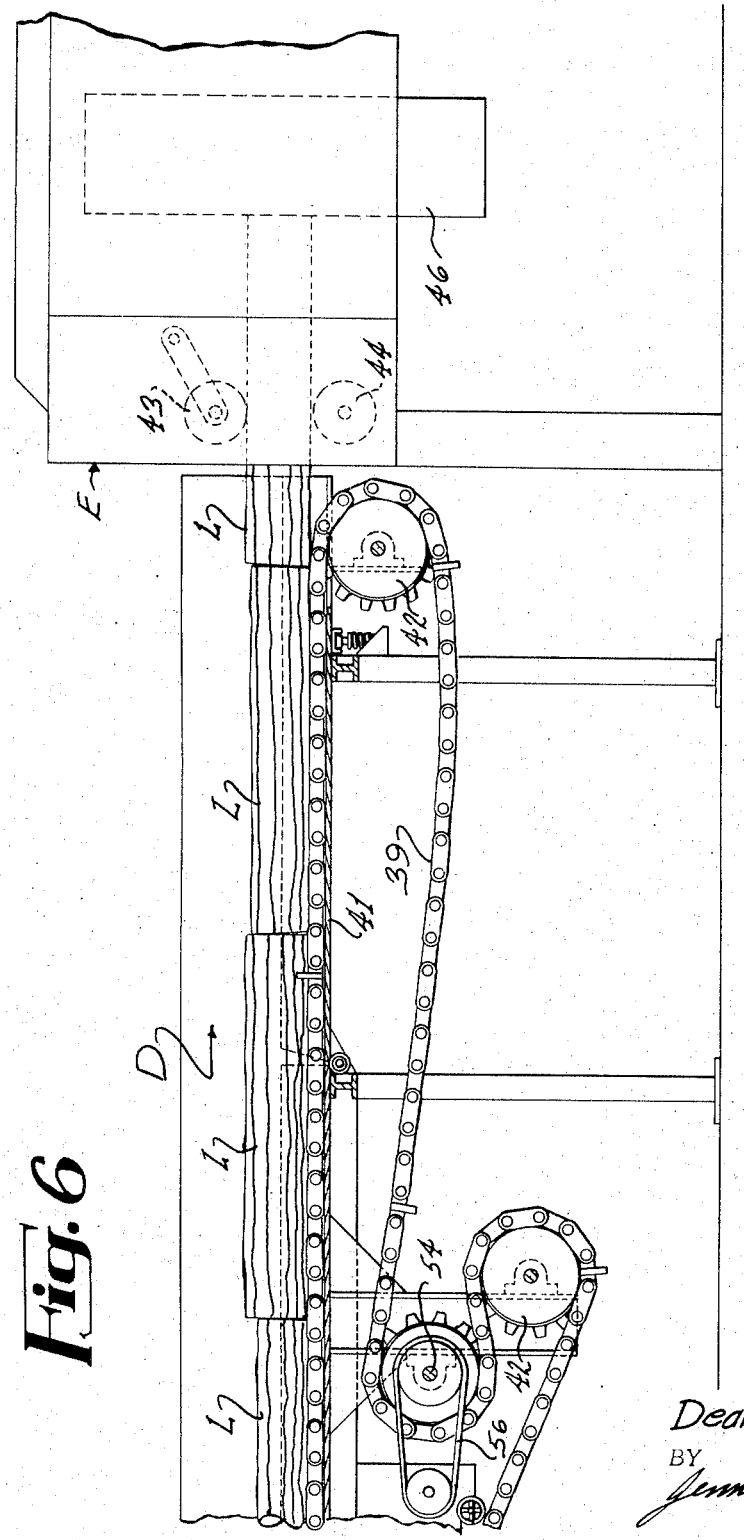

United States Patent Office 3,435,861
Patented Apr. 1, 1969

3,435,861
SYSTEM FOR DEBARKING LOGS
Dean W. Shields, Birmingham, Ala., assignor to Beloit Corporation, a corporation of Wisconsin
Filed Aug. 1, 1966, Ser. No. 569,155
Int. Cl. B27l 1/00
U.S. Cl. 144—208                              4 Claims

ABSTRACT OF THE DISCLOSURE

A system for feeding logs to a debarker wherein the logs are fed axially, end-to-end, the conveyor system being operated in timed relation such that the logs are fed axially to the debarker at a linear rate equalling substantially the maximum debarking rate of the debarker, eliminating lost or idling time for the debarker and utilizing it to the maximum extent.

---

This invention relates to a system for debarking logs and more particularly relates to an apparatus for conveying relatively short lengths of logs to a debarker in such manner that the debarker is supplied with logs to be debarked substantially continuously, thereby eliminating any idle running time of the debarker.

An object of my invention is to provide a system of the character designated in which the logs to be debarked and which are cut into short lengths, usually six to eight feet, are dumped randomly, although generally axially parallel into a hopper, from whence the logs are picked up and delivered one by one onto a first lateral conveyor, which conveyor delivers them to an aligned lateral conveyor, the latter of which feeds the debarker. In order that the logs may be delivered continuously to the debarker I propose to run the conveyor to which the logs are first delivered one by one faster than the conveyor which feeds the debarker, thus making room for oncoming logs to be delivered to the first conveyor while at the same time assuring that the logs are fed to the debarker at its maximum capacity.

A further object of my invention is to provide means associated with the lifting conveyor, which conveyor, as stated, picks the logs up from the hopper, which means shall be effective to assure that only one log at a time is delivered from the upper end of the lifting conveyor, thereby preventing the delivery of a multiplicity of logs to the first lateral conveyor, assuring that the logs are delivered thereto in end to end relationship.

More specifically, my invention contemplates a lifting conveyor on which there are attachments capable of holding more than a single log, to which the logs are fed from the hopper, together with means in the form of a pair of arms or the like which are adjustable relative to the log engaging side of the upwardly moving conveyor, thereby to remove from the attachments prior to reaching the upper end of the conveyor, all except a single log.

Apparatus illustrating features of my improved system is shown in the accompanying drawings forming a part of this application in which:

FIG. 3 is a fragmental, enlarged detail vertical view through a portion of the discharge end of the log hopper and the elevating conveyor for the logs;

FIG. 4 is a detail sectional view taken generally along line 4—4 of FIG. 3;

FIG. 5 is an enlarged detail sectional view through the apparatus and illustrating the relationship of the first lateral log receiving conveyor to the upper end of the elevating conveyor and also showing a fragment of fed end of the second lateral conveyor; and FIG. 6 is a view of the discharge end of the second conveyor, showing the manner of feeding the logs to the feedworks of the debarker.

Figure 1:
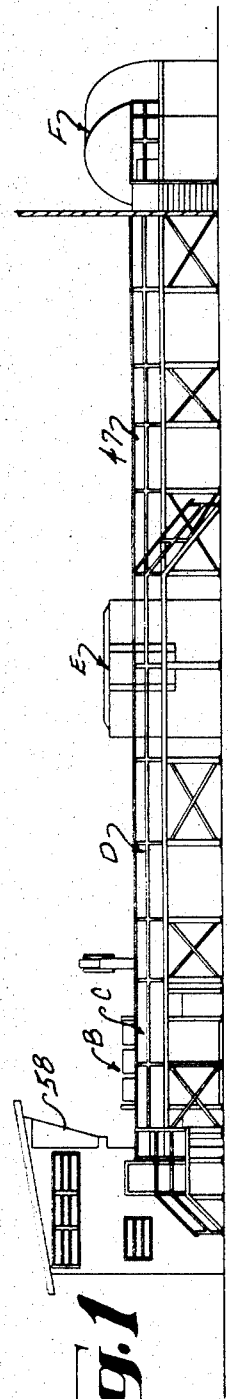
FIG. 1 is a side elevational view, somewhat diagrammatic and drawn to a small scale and showing the complete system.
Figure 2:
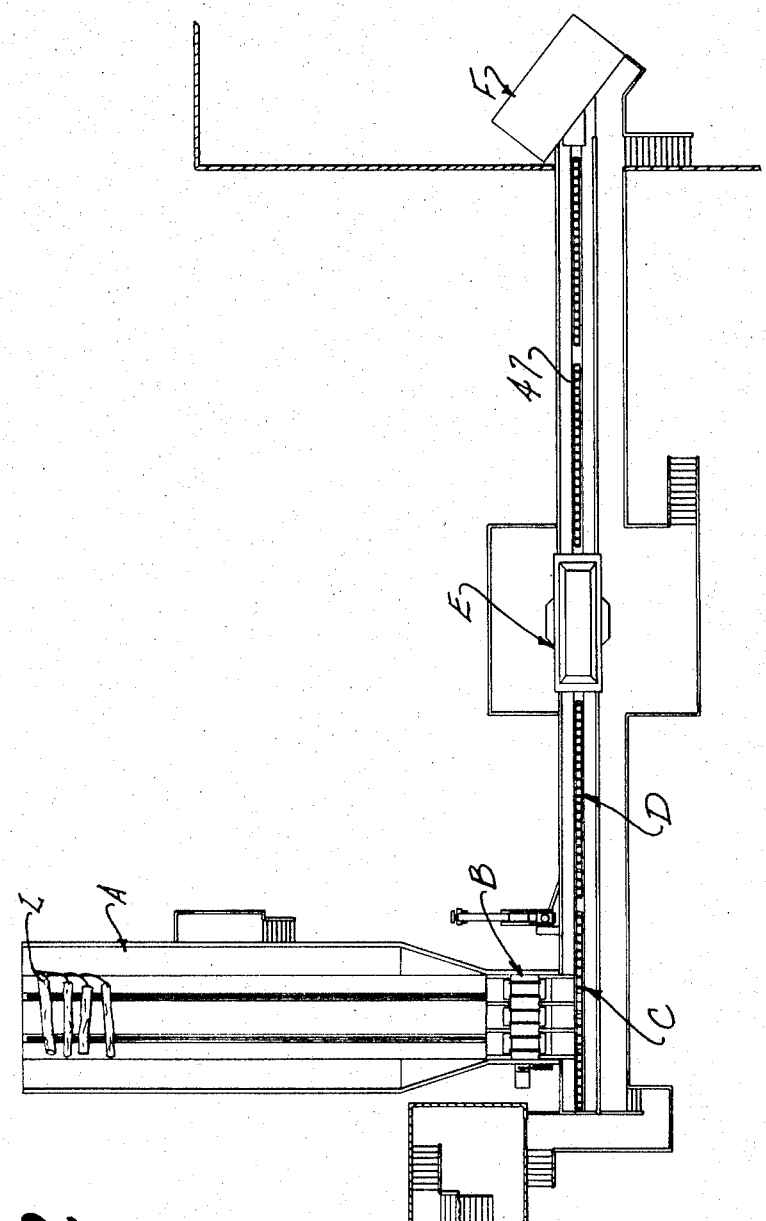
FIG. 2 is a plan view of the system shown diagrammatically in FIG. 1.

Referring now to the drawings for a better understanding of my invention and particularly to FIGS. 1 and 2, my improved system comprises essentially five major parts. At A, I show a hopper into which the logs L are dumped at random, but generally axially parallel to each other. That is to say, the logs are dumped into the hopper by a mechanical means, in groups. The next major portion of the apparatus is a vertically inclined lifting conveyor unit indicated at B, which as I show particularly in FIG. 3 receives the logs L from the discharge end of the hopper A and raises them vertically as will later appear. The unit B is designed to deliver the logs, one at a time, onto a first lateral conveying unit C. Aligned with the conveyor unit C is a second conveyor unit D which delivers the logs into the debarker indicated diagrammatically at E.

As will later appear, the hopper unit A embodies a moving bottom in the form of a chain conveyor 10. Also, for reasons to appear more in detail, the chain unit C is driven at a faster linear rate than is chain unit D.

It will be understood that the chain conveyor 10 in the log hopper A is driven by any suitable means, such for instance as the motor and chain arrangement indicated at 11, FIG. 3. As the logs L are delivered from the end 12 of the unit A they roll down a slide 13 which overlies a moving set of chain conveyors 14 forming a part of the unit B. As shown particularly in FIG. 4 there may be a plurality of the vertical lifting chains 14, spaced apart, and the chains may be equipped with log lifting attachments 16, the attachments projecting outwardly far enough to hold or lift, generally, more than one log at a time. It will further be understood that the conveyor chains 14 are mounted on sprockets 17 and 18 in turn mounted on shafts 19 and 21, respectively, suitable framework being provided to support all these parts. The load carrying flight of the chains 14 may run over a load supporting plate 22 which has slots 23 therein for a purpose to appear. The chains 14 of the unit B may be driven by means of the motor and chain drive indicated at 24.

In view of the fact that it is an object of my invention to deliver the logs one at a time onto the conveyor unit C, and because the logs to be handled by the device vary greatly in diameter, that is, from 4 inches, to 30 inches in diameter, I provide means to assure that the attachments 16 only deliver one log at a time to the conveyor C. Secured to a common shaft 26 mounted in bearings 26a are a pair of pusher arms 27 which project upwardly and outwardly through the slots 23 in the plate 22. By means of a fluid pressure cylinder 28, pivoted at 29 to the framework and at 31 to one of the arms 27, I provide means for adjusting the in and out position of the projecting upper ends of the arms. Thus, with the arms projecting generally in the position shown, the arms serve to scrape off or return to the lower part of the apparatus all but a single one of the logs, whether they are of the smallest or largest which the device is to handle. Further, an operator of the apparatus, who may conveniently be located in a booth 58 overlooking the apparatus, may by means of the cylinder 28, move the arms inwardly or outwardly while visually inspecting the device as it is running, thus to assure that only a single log at a time is delivered from the top of the unit B to fall into the conveyor unit C. As illustrated, as the logs pass over the top of the unit D they fall down or roll down members 32, onto the conveyor unit C.

The conveyor unit C may consist of an endless chain 33 having log engaging attachments 34 thereon which are spaced fairly widely apart. Further, the load bearing flight of the chain may be supported by a plate 36 which in turn is supported on suitable framework indicated at 37. The chain may pass over sprockets 38 which are mounted on suitably journaled shafts.

Aligned with the conveyor unit C, as stated, is a quite similar chain conveyor unit D. This unit may also consist of an endless chain 39, supported on a plate 41, the chain 39 passing over sprockets 42 mounted on suitably journaled shafts.

The debarker E, which may be a ring type debarker, but not necessarily so, is adapted for its feedworks indicated by the rollers 43 and 44 to receive the logs L as they are fed thereinto from the conveyor unit D. As will be understood, the feedworks 43 and 44 are positively driven so that the logs are fed into the debarker ring indicated diagrammatically at 46, from whence they are discharged on conveyors 47 or the like to any suitable subsequent process, such for instance, by feeding them directly into a chipper indicated generally by the letter F.

The chain 33 of the conveyor unit C, may be driven from drive unit 48 which in turn is driven by a motor 49. Thus, the shaft 51 of the conveyor unit C may be driven through a chain 52 and the speed of that drive may be approximately one and one-half times the linear speed of unit D. Similarly, shaft 54 of the conveyor unit D may be driven through a chain 56 and its speed may be set at about the feed rate of the debarker.

It will be understood that the motor 24 which drives the conveyor units of the lifting conveyor section B is a variable speed drive.

From the foregoing it will be seen that my improved system is designed to convey the logs from the hopper A, one at a time, and to deliver them onto the lateral conveyor C. Because of the fact that the logs are to be fed endwise on the conveyor D, conveyor C is driven considerably faster than D. That is, and by way of example, I may drive the conveyor C at 250 linear feet per minute and drive the conveyor D at 180 linear feet per minute. This assures that the logs delivered onto the unit C are quickly moved toward the unit D in time to make room for the next oncoming logs from the top of the lifting conveyor unit B, thereby preventing any overlapping or doubling up of logs on the conveyor C. With the logs being quickly moved toward unit D, the debarker is continuously or constantly supplied with logs, whereby there is no idle running time of the debarker, increasing its efficiency.

It has been found that there is a slight amount of slippage in the feedwords of the debarker. Therefore, the feedworks of the debarker are related to the speed of delivery of the unit D in such fashion that the feedworks are driven about two percent faster linear feed rate than the delivery rate of the logs on the unit D.

From the foregoing it will be apparent that I have devised an improved system for handling short lengths of logs and feeding them into a debarker or similar process machinery in such fashion that the debarker is always supplied with work. In actual practice my invention has proved to be extremely satisfactory. By means of the adjustable or movable arms 27, in combination with the lifting conveyor, I am able in practice to assure the delivery of but a single log at a time over the top of the lifting conveyor. By driving the receiving chain unit C at a faster linear rate than the chain conveyor D which feeds the debarker, I not only assure that the debarker conveyor is adequately supplied at all times, but also assure that there is room on the conveyor C for the oncoming logs being raised up from the hopper, preventing overlapping, doubling or piling up on the conveyor C.

While I have shown my invention in but one form, it will be obvious to those skilled in the art that it is not so limited, but is susceptible of various other changes and modifications without departing from the spirit thereof.

What I claim is:

1. In a system for debarking logs:
    (a) an upwardly inclined conveyor to the lower end of which groups of the logs are fed and having means associated therewith for discharging over the upper end thereof one log at a time,
    (b) a conveyor onto which the logs are delivered in end-to-end relation from the upper end of the inclined conveyor,
    (c) a second conveyor having its log receiving end located to receive the logs from the conveyor set forth in (b) above and in said end-to-end relation,
    (d) a debarker located adjacent the discharge end of the conveyor set forth in (c) above and disposed to debark the logs as they pass therethrough,
    (e) means to drive all of the aforesaid conveyors at relative speeds such that the logs on the conveyor set forth in (c) above are maintained in end-to-end relation and are moved into the debarker at substantially the maximum debarking capacity of the debarker, whereby the debarker is supplied substantially continuously with logs, and
    (f) means to remove the debarked logs from the debarker.

2. Apparatus defined in claim 1 in which the inclined conveyor comprises:
    (a) laterally spaced endless members having sets of log lifting attachments thereon each of which set is capable of simultaneously lifting more than one log,
    (b) a pair of arms located in position to project outwardly of the log engaging surfaces of the conveyor and in the path of the logs being conveyed upwardly on the attachment, and
    (c) means to adjust the outward position of said arms whereby the arms limit the log-holding capacity of the attachment to a single log, assuring that the logs are discharged one by one over the upper end of the inclined conveyor.

3. Apparatus as defined in claim 1 in which the conveyor set forth in (b) thereof is driven at a linear rate of speed faster than the speed at which the conveyor set forth in (c) thereof is driven, whereby logs delivered to the (b) conveyor are moved toward the (c) conveyor in ample time to make room on the (b) conveyor for oncoming logs from the (a) conveyor thereby preventing overlapping or stacking of the logs on the (b) conveyor.

4. In a system for debarking logs:
    (a) a feeder hopper into which the logs are piled generally axially parallel and having a moving conveyor bottom which feeds the logs toward a rear end of the hopper,
    (b) a lifting conveyor for removing the logs one at a time from the rear end of the hopper and extending upwardly to discharge the logs one at a time over the upper end thereof,
    (c) a first substantially horizontal log conveyor located in position to receive one by one the logs discharged over the upper end of conveyor (b) and extending laterally therefrom,
    (d) a second substantially horizontal conveyor located in alignment with conveyor (c) and at the discharge end thereof in position to receive the logs from conveyor (c),
    (e) a debarker located in position to receive the logs from conveyor (d), and
    (f) means to drive said conveyors at such speeds relative to the debarking speed of the debarker and to each other that:
        (1) logs delivered to conveyor (c) are shifted toward conveyor (d) in time to prevent side by side stacking or overlapping of logs on conveyor (c), and
        (2) conveyor (d) supplies logs to the debarker at a rate substantially approximating the debarking rate of the debarker, whereby the debarker operates at maximum capacity with substantially no lost or inactive running time between logs.

References Cited

UNITED STATES PATENTS

| | | | |
|---|---|---|---|
| 1,457,352 | 6/1923 | Dreher | 198—76 |
| 1,527,337 | 2/1925 | Wilcox | 198—55 X |
| 2,242,409 | 5/1941 | Anderson | 198—76 |
| 2,297,138 | 9/1942 | Ferri | 198—55 X |
| 2,625,968 | 1/1953 | Eklund et al. | 144—208 |
| 2,765,012 | 10/1056 | Riddell et al. | 144—208 |
| 2,893,452 | 7/1959 | Shaw et al. | 144—208 |
| 3,111,214 | 11/1963 | Heikinheimo | 198—76 X |

ANDREW R. JUHASZ, *Primary Examiner.*

F. T. YOST, *Assistant Examiner.*

U.S. Cl. X.R.

144—242